(12) United States Patent
Kadyan et al.

(10) Patent No.: US 12,739,642 B2
(45) Date of Patent: Sep. 15, 2026

(54) METHODS, SYSTEMS, AND COMPUTER READABLE MEDIA FOR DETECTING AND MITIGATING SECURITY ATTACKS ON PRODUCER NETWORK FUNCTIONS (NFS) USING MAPPINGS BETWEEN DYNAMICALLY ASSIGNED SERVICE-BASED INTERFACE (SBI) MESSAGE IDENTIFIERS AND PROXY NF IDENTIFIERS AT PROXY NF

(71) Applicant: Oracle International Corporation, Redwood Shores, CA (US)

(72) Inventors: Sonia Kadyan, New Delhi (IN); John Nirmal Mohan Raj, Bangalore (IN); Jay Rajput, Bangalore (IN); Ashish Jyoti Sharma, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 253 days.

(21) Appl. No.: 18/523,487

(22) Filed: Nov. 29, 2023

(65) Prior Publication Data

US 2025/0175801 A1 May 29, 2025

(51) Int. Cl.
*H04L 29/06* (2006.01)
*H04W 12/06* (2021.01)
(Continued)

(52) U.S. Cl.
CPC ......... *H04W 12/122* (2021.01); *H04W 12/06* (2013.01); *H04W 12/106* (2021.01)

(58) Field of Classification Search
CPC .. H04W 12/122; H04W 12/106; H04W 12/06
(Continued)

(56) References Cited

U.S. PATENT DOCUMENTS 10,778,527 B2 9/2020 Assali et al.
11,483,741 B2 10/2022 Nair et al.
(Continued)

FOREIGN PATENT DOCUMENTS

CN 112003912 B 11/2021
CN 120614685 A 9/2025
(Continued)

OTHER PUBLICATIONS

Tang, "A Systematic Analysis of 5G Networks with a Focus on 5G Core Security", Feb. 10, 2022, IEEE, pp. 18298-18318 (Year: 2022).*

(Continued)

*Primary Examiner* — Taghi T Arani
*Assistant Examiner* — Gregory A Lane
(74) *Attorney, Agent, or Firm* — Jenkins, Taylor & Hunt, P.A.

(57) ABSTRACT

A method for detecting and mitigating security attacks on producer NFs using mappings between dynamically assigned SBI message IDs and proxy NF IDs includes, at a proxy NF, automatically creating a database of mappings between proxy NF IDs and SBI message IDs comprising resource IDs dynamically assigned by producer NFs in response to request messages from consumer NFs. The method further includes using the mappings to validate received inter-PLMN SBI request messages and performing network security actions for the received inter-PLMN SBI request messages for which validation fails.

19 Claims, 7 Drawing Sheets

(51) Int. Cl.
*H04W 12/106* (2021.01)
*H04W 12/122* (2021.01)

(58) Field of Classification Search
USPC .......................................................... 726/23
See application file for complete search history.

(56) References Cited

U.S. PATENT DOCUMENTS 11,533,358 B1 12/2022 Khare et al.
11,553,342 B2 1/2023 Mahalank et al.
11,825,310 B2 11/2023 Rajput et al.
11,876,703 B2 1/2024 Bartolome Rodrigo
12,531,894 B2 1/2026 Mohan Raj et al.
2020/0036754 A1 1/2020 Livanos
2021/0111985 A1* 4/2021 Mahalank ............... H04L 67/56
2021/0297935 A1 9/2021 Belling et al.
2022/0022040 A1* 1/2022 Mahalank ............. H04W 12/08
2022/0053372 A1 2/2022 Shekhar et al.
2022/0070648 A1 3/2022 Krishan
2022/0095111 A1 3/2022 Fu et al.
2022/0104020 A1* 3/2022 Rajput .................. H04W 12/12
2022/0159464 A1 5/2022 Rajput et al.
2022/0200847 A1* 6/2022 Bartolome Rodrigo ..................... H04L 41/082
2022/0201487 A1 6/2022 Minokuchi
2022/0247779 A1 8/2022 Rajput et al.
2022/0272165 A1 8/2022 Bawa et al.
2022/0287089 A1* 9/2022 Singh ...................... H04L 63/10
2022/0294775 A1 9/2022 Singh et al.
2022/0295282 A1 9/2022 Rajput
2022/0322053 A1 10/2022 Das
2022/0353263 A1 11/2022 Choyi et al.
2022/0360447 A1 11/2022 Rajput et al.
2022/0360989 A1* 11/2022 Rajput .................. H04W 12/06
2022/0361085 A1 11/2022 Rajput
2023/0007536 A1 1/2023 Sharma
2023/0052658 A1 2/2023 Khare et al.
2023/0141233 A1 5/2023 Pulipati et al.
2023/0147549 A1 5/2023 Singh
2023/0199497 A1 6/2023 Krishan et al.
2023/0217355 A1 7/2023 Srivastava
2023/0284008 A1 9/2023 Muhanna et al.
2023/0291818 A1 9/2023 Yang
2023/0388230 A1 11/2023 Krishan
2023/0396602 A1 12/2023 Wu et al.
2023/0413052 A1 12/2023 Aggarwal
2024/0056506 A1 2/2024 Bommisetty
2024/0107299 A1 3/2024 Wang
2024/0129876 A1* 4/2024 Sarma ................... H04W 60/04
2024/0163661 A1 5/2024 Krishan
2024/0381224 A1 11/2024 Landais et al.
2024/0406851 A1 12/2024 Jayramachar
2025/0126475 A1 4/2025 Li
2025/0175491 A1 5/2025 Mohan Raj et al.
2025/0175800 A1 5/2025 Kadyan et al.
2025/0234187 A1 7/2025 Mohan Raj et al.
2025/0294358 A1 9/2025 Mohan Raj et al.

FOREIGN PATENT DOCUMENTS

EP 4 152 691 A1 3/2023
WO WO-2024/125763 A1 6/2024
WO WO 2025/117125 A1 6/2025

OTHER PUBLICATIONS

Tang, "A Systematic Analysis of 5G Networks With a Focus on 5G Core Security", Jan. 2022, IEEE, pp. 18298-18318 (Year: 2022).*

3rd Generation Partnership Project; Technical Specification Group Core Network and Terminals; 5G System; Technical Realization of Service Based Architecture; Stage 3 (Release 18) 3GPP TS 29.500 V18.4.0 pp. 1-149 (Dec. 2023).

3rd Generation Partnership Project; Technical Specification Group Core Network and Terminals; 5G System; Network Function Repository Services; Stage 3 (Release 18) 3GPP TS 29.510 V18.5.0, pp. 1-382 (Dec. 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.5.0 pp. 1-130 (Dec. 2023).

3rd Generation Partnership Project; Technical Specification Group Services and System Aspects; Security architecture and procedures for the 5G System; Stage 2 (Release 18) 3GPP TS 33.501 V18.4.0 pp. 1-326 (Dec. 2023).

Keller et al., "Roaming in the 5G System: the 5GS roaming architecture," Ericsson Technology Review Articles (Jun. 17, 2021).

5G Roaming Guidelines, Official Document NG.113—GSM Association Version 2.0, pp. 1-36 (May 28, 2020).

Content for TS 33.501 Word version: 18.4.0, pp. 1-8 (Downloaded Jan. 31, 2024) https://www.tech-invite.com/3m33/toc/tinv-3gpp-33-501 e.html.

Commonly-Assigned, co-pending U.S. Appl. No. 18/608,071 for "Methods, Systems, and Computer Readable Media for Filtering Inter-Public Land Mobile Network (PLMN) Messages at Security Edge Protection Proxy (Sepp) to Implement Roaming Agreements" (Unpublished, filed Mar. 18, 2024).

"3rd Generation Partnership Project; Technical Specification Group Services and System Aspects; System architecture for the 5G System (5GS); Stage 2 (Release 18)" 3GPP TS 23.501, V18.3.0, pp. 1-696 (Sep. 2023).

"3rd Generation Partnership Project; Technical Specification Group Services and System Aspects; Procedures for the 5G System; Stage 2 (Release 18)" 3GPP TS 23.502, V18.3.0, pp. 1-899 (Sep. 2023).

"3rd Generation Partnership Project; Technical Specification Group Core Network and Terminals; 5G System; Technical Realization of Service Based Architecture; Stage 3 (Release 18)" 3GPP TS 29.500, V18.3.0, pp. 1-148 (Sep. 2023).

"3rd Generation Partnership Project; Technical Specification Group Core Network and Terminals; 5G System; Session Management Services; Stage 3 (Release 18)" 3GPP TS 29.502, V18.4.0, pp. 1-355 (Sep. 2023).

"3rd Generation Partnership Project; Technical Specification Group Core Network and Terminals; 5G System; Network Function Repository Services; Stage 3 (Release 18)" 3GPP TS 29.510, V18.4.0, pp. 1-373 (Sep. 2023).

"3rd Generation Partnership Project; Technical Specification Group Services and System Aspects; Security architecture and procedures for 5G System (Release 18)" 3GPP TS 33.501, V18.3.0, pp. 1-322 (Sep. 2023).

3rd Generation Partnership Project; Technical Specification Group Services and System Aspects; Security architecture and pocedures, 3GPP Draft; 33501-HAO, 3rd Generation Partnership Project (3GPP) Jun. 22, 2023.

Notification of Transmittal of the International Search Report and the Written Opinion of the International Searching Authority, or the Declaration for International Patent Application Serial No. PCT/US2024/053761 (Feb. 4. 2025).

Commonly-Assigned, co-pending U.S. Appl. No. 18/414,455 for "Methods, Systems, and Computer Readable Media for Detecting and Processing Inter-Public Land Mobile Network (PLMN) Service-Based Interface (SBI) Messages Without 3GPP-SBI-Originating-Network-ID Headers" (Unpublished, filed Jan. 16, 2024).

Commonly-Assigned, co-pending U.S. Appl. No. 18/523,425 for "Methods, Systems, and Computer Readable Media for Detecting and Mitigating Security Attacks on Producer Network Functions (NFs) Using Access Token to Non-Access-Token Parameter Correlation at Proxy NF" (Unpublished, filed Nov. 29, 2023).

Commonly-Assigned, co-pending U.S. Appl. No. 18/523,322 for "Methods, Systems, and Computer Readable Media for Detecting and Mitigating Security Attacks on Producer Network Functions (NFs) Using Error Response Messages" (Unpublished, filed Nov. 29, 2023).

3rd Generation Partnership Project; Technical Specification Group Core Network and Terminals; 5G System; Public Land Mobile Network (PLMN) Interconnection; Stage 3 (Release 18) 3GPP TS 29.573 V18.4.0 pp. 1-116 (Sep. 2023).

(56) References Cited

OTHER PUBLICATIONS

Non-Final Office Action for U.S. Appl. No. 18/523,425 (Jul. 31, 2025).
Notice of Allowance for U.S. Appl. No. 18/523,322 (Jul. 18, 2025).
Non-Final Office Action for U.S. Appl. No. 18/414,455 (Jan. 6, 2026).
Notice of Allowance for U.S. Appl. No. 18/523,425 (Dec. 10, 2025).

* cited by examiner

METHODS, SYSTEMS, AND COMPUTER READABLE MEDIA FOR DETECTING AND MITIGATING SECURITY ATTACKS ON PRODUCER NETWORK FUNCTIONS (NFS) USING MAPPINGS BETWEEN DYNAMICALLY ASSIGNED SERVICE-BASED INTERFACE (SBI) MESSAGE IDENTIFIERS AND PROXY NF IDENTIFIERS AT PROXY NF

TECHNICAL FIELD

The subject matter described herein relates to mitigating security attacks in communications networks. More particularly, the subject matter described herein relates to methods, systems, and computer readable media for detecting and mitigating security attacks on producer NFs using mappings between dynamically assigned SBI message IDs and proxy NF IDs at a proxy NF.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and other types of networks is that inter-public land mobile network (PLMN) SBI request messages can be used by a hacker to implement security attacks against a PLMN. One example of a security attack is a denial of service (DOS) attack where inter-PLMN SBI request messages are used to overwhelm the processing and/or memory resources of a producer NF and cause the producer NF to become unavailable. For example, a consumer NF in a trusted network can be compromised by malware code and forced to send a high volume of SBI request messages to another network. The producer NF processes the messages, which makes the producer NF unavailable to process messages from legitimate consumer NFs. Other types of security attacks that can originate from trusted networks include attacks to steal subscriber and network information and attacks that cause producer NFs to enter an error state using malformed messages.

Accordingly, in light of these and other difficulties, there exists a need for improved methods, systems, and computer readable media for screening inter-PLMN SBI request messages at a proxy NF to mitigate DoS and other types of security attacks.

SUMMARY

A method for detecting and mitigating security attacks on producer NFs using mappings between dynamically assigned SBI message IDs and proxy NF IDs includes receiving, by a proxy NF, a first inter-PLMN SBI request message. The method includes obtaining, by the proxy NF, a proxy NF ID associated with the first inter-PLMN SBI request message. The method further includes forwarding, by the proxy NF, the first inter-PLMN SBI request message to a producer NF. The method further includes receiving, by the proxy NF and from the producer NF, a response message to the first inter-PLMN SBI request message. The method further includes reading, by the proxy NF and from the response message, an SBI message ID comprising a resource ID dynamically assigned by the producer NF in response to the first inter-PLMN SBI request message. The method further includes creating and storing, by the proxy NF and in an SBI message ID mappings database, a record that creates a mapping between the proxy NF ID and the SBI message ID. The method further includes using, by the proxy NF, the mapping to validate SBI request messages received by the proxy NF. The method further includes performing, by the proxy NF, a network security action for the SBI request messages for which validation fails.

According to another aspect of the subject matter described herein, using the mapping to validate SBI request messages includes performing a lookup in the SBI message ID mappings database using a resource ID from a second inter-PLMN SBI request message received by the proxy NF and locating the record, obtaining a proxy NF ID associated with the second inter-PLMN SBI request message, and determining whether the proxy NF ID associated with the second inter-PLMN SBI request message matches the proxy NF ID in the record, performing the network security action includes at least one of: rejecting the second inter-PLMN SBI request message and generating and transmitting a fake error response message when the proxy NF ID associated with the second inter-PLMN SBI request message does not match the proxy NF ID in the record.

According to another aspect of the subject matter described herein, obtaining the proxy NF ID includes obtaining a SEPP ID, reading the SBI message ID includes reading a value of an smContextRef parameter, creating and storing the record that creates the mapping between the proxy NF ID and the SBI message ID includes writing the SEPP ID and the value of the smContextRef parameter in the record, using the mapping to validate SBI request messages includes performing a lookup in the SBI message ID mappings database using a value of an smContextRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and performing the network security action includes performing the network security action when the SEPP ID associated with the second inter-PLMN SBI request message does not match the SEPP ID in the record.

According to another aspect of the subject matter described herein, obtaining the proxy NF ID includes obtaining a SEPP ID, reading the SBI message ID includes reading a value of a pduSessionRef parameter, creating and storing the record that creates the mapping between the proxy NF ID and the SBI message ID includes writing the SEPP ID and the value of the pduSessionRef parameter in the record, using the mapping to validate SBI request messages includes performing a lookup in the SBI message ID mappings database using a value of a pduSessionRef parameter from a second inter-PLMN SBI request message received by the proxy and locating the record, obtaining a SEPP ID associated with the second inter-PLMN SBI request message, and determining whether the SEPP ID associated with the second inter-PLMN SBI request message matches the SEPP ID in the record, and performing the network security action includes performing the network security action when the SEPP ID associated with the second inter-PLMN SBI request message does not match the SEPP ID in the record.

According to another aspect of the subject matter described herein, obtaining the proxy NF ID includes obtaining a SEPP ID, reading the SBI message ID includes reading a value of a subscriptionId parameter, storing the record that creates the mapping between the proxy NF ID and the SBI message ID includes writing the SEPP ID and the value of the subscriptionId parameter in the record, using the mapping to validate SBI request messages includes performing a lookup in the SBI message ID mappings database using a value of a subscriptionId parameter from a second inter-PLMN SBI request message, obtaining a SEPP ID associated with the second inter-PLMN SBI request message received by the proxy NF, and determining whether the SEPP ID associated with the second inter-PLMN SBI request message matches the SEPP ID in the record, and performing the network security action includes performing the network security action when the SEPP ID associated with the second inter-PLMN SBI request message does not match the SEPP ID in the record.

According to another aspect of the subject matter described herein, obtaining the proxy NF ID includes obtaining a SEPP ID, reading the SBI message ID includes reading a value of a polAssoId parameter, creating and storing the record that creates the mapping between the proxy NF ID and the SBI message ID includes writing the SEPP ID and the value of the polAssoId parameter in the record, using the mapping to validate SBI request messages includes performing a lookup in the SBI message ID mappings database using a value of a polAssoId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, performing the network security action includes performing the network security action when the SEPP ID associated with the second inter-PLMN SBI request message does not match the SEPP ID in the record.

According to another aspect of the subject matter described herein, obtaining the proxy NF ID includes obtaining a SEPP ID, reading the SBI message ID includes reading a value of an authCtxId parameter, storing the record that creates the mapping between the proxy NF ID and the SBI message ID includes writing the SEPP ID and the value of the authCtxId parameter in the record, using the mapping to validate SBI request messages includes performing a lookup in the SBI message ID mappings database using a value of an authCtxId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and performing the network security action includes performing the network security action when the SEPP ID associated with the second inter-PLMN SBI request message does not match the SEPP ID in the record.

According to another aspect of the subject matter described herein, obtaining the proxy NF ID includes obtaining a SEPP ID, reading the SBI message ID includes reading a value of a ueCtxId parameter, creating and storing the record that creates the mapping between the proxy NF ID and the SBI message ID includes writing the SEPP ID and the value of the ueCtxId parameter in the record, using the mapping to validate SBI request messages includes performing a lookup in the SBI message ID mappings database using a value of an ueCtxId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

According to another aspect of the subject matter described herein, performing the network security action includes at least one of: rejecting the second SBI inter-PLMN SBI request message and generating and transmitting a fake error response message.

According to another aspect of the subject matter described herein, the proxy NF comprises a security edge protection proxy (SEPP), a service communication proxy (SCP), or a roaming hub.

According to another aspect of the subject matter described herein, a system for detecting and mitigating security attacks on producer NFs using mappings between dynamically assigned SBI message IDs and proxy NF IDs is provided. The system includes a proxy NF including at least one processor and a memory. The system further includes an inter-PLMN SBI request security controller implemented by the at least one processor for receiving a first inter-PLMN SBI request message, obtaining a proxy NF ID associated with the first inter-PLMN SBI request message, forwarding the first inter-PLMN SBI request message to a producer NF, receiving, from the producer NF, a response message to the first inter-PLMN SBI request message, reading, from the response message, an SBI message ID comprising a resource ID dynamically assigned by the producer NF in response to the first inter-PLMN SBI request message, creating and storing, by the proxy NF and in an SBI message ID mappings database, a record that creates a mapping between the proxy NF ID and the SBI message ID, using the mapping to validate SBI request messages received by the proxy NF, and performing a network security action for the SBI request messages for which validation fails.

According to another aspect of the subject matter described herein, the inter-PLMN SBI request security controller is configured to use the mapping to validate SBI request messages by performing a lookup in the SBI message ID mappings database using a resource ID from a second inter-PLMN SBI request message received by the proxy NF and locating the record, obtaining a proxy NF ID associated with the second inter-PLMN SBI request message, and determining whether the proxy NF ID associated with the second inter-PLMN SBI request message matches the proxy NF ID in the record, and perform the network security action by at least one of: rejecting the second inter-PLMN SBI request message and generating and transmitting a fake error response message when the proxy NF ID associated with the second inter-PLMN SBI request message does not match the proxy NF ID in the record.

According to another aspect of the subject matter described herein, the proxy NF ID associated with the first inter-PLMN SBI request message comprises an SEPP ID, the SBI message ID read from the first inter-PLMN SBI request message includes a value of an smContextRef parameter, the inter-PLMN request security controller is configured to create and store the record that creates the mapping between the proxy NF ID and the SBI message ID by writing the SEPP ID and the value of the smContextRef parameter in the record, the inter-PLMN SBI request security controller is configured to use the mapping to validate SBI request messages by performing a lookup in the SBI message ID mappings database using a value of an smContextRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and the inter-PLMN SBI request security controller is configured to perform the network security action when the SEPP ID associated with the second inter-PLMN SBI request message does not match the SEPP ID in the record.

According to another aspect of the subject matter described herein, the proxy NF ID associated with the first inter-PLMN SBI request message comprises a SEPP ID, the SBI message ID read from the first inter-PLMN SBI request message comprises a value of a pduSessionRef parameter, the inter-PLMN SBI request security controller is configured to create and store the record that creates the mapping between the proxy NF ID and the SBI message ID by writing the SEPP ID and the value of the pduSessionRef parameter in the record, the inter-PLMN SBI request security controller is configured to use the mapping to validate SBI request messages by performing a lookup in the SBI message ID mappings database using a value of a pduSessionRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and the inter-PLMN SBI request security controller is configured to perform the network security action when the SEPP ID associated with the second inter-PLMN SBI request message does not match the SEPP ID in the record.

According to another aspect of the subject matter described herein, the proxy NF ID associated with the first inter-PLMN SBI request message includes a SEPP ID, the SBI message ID read from the first inter-PLMN SBI request message includes a value of a subscriptionId parameter, the inter-PLMN SBI request security controller is configured to store the record that creates the mapping between the proxy NF ID and the SBI message ID by writing the SEPP ID and the value of the subscriptionId parameter in the record, the inter-PLMN SBI request security controller is configured to use the mapping to validate SBI request messages by performing a lookup in the SBI message ID mappings database using a value of a subscriptionId parameter from a second inter-PLMN SBI request message, obtaining a SEPP ID associated with the second inter-PLMN SBI request message received by the proxy NF, and determining whether the SEPP ID associated with the second inter-PLMN SBI request message matches the SEPP ID in the record, the inter-PLMN SBI request security controller is configured to perform the network security action when the SEPP ID associated with the second inter-PLMN SBI request message does not match the SEPP ID in the record.

According to another aspect of the subject matter described herein, the proxy NF ID associated with the first inter-PLMN SBI request message includes a SEPP ID, the SBI message ID read from the first inter-PLMN SBI request message includes a value of a polAssoId parameter, the inter-PLMN SBI request security controller is configured to create and store the record that creates the mapping between the proxy NF ID and the SBI message ID includes writing the SEPP ID and the value of the polAssoId parameter in the record, the inter-PLMN SBI request security controller is configured to using the mapping to validate SBI request messages by performing a lookup in the SBI message ID mappings database using a value of a polAssoId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, the inter-PLMN SBI request security controller is configured to perform the network security action when the SEPP ID associated with the second inter-PLMN SBI request message does not match the SEPP ID in the record.

According to another aspect of the subject matter described herein, the proxy NF ID associated with the first inter-PLMN SBI request message includes a SEPP ID, the SBI message ID read from the first inter-PLMN SBI request message includes a value of an authCtxId parameter, the inter-PLMN SBI request security controller is configured to store the record that creates the mapping between the proxy NF ID and the SBI message ID by writing the SEPP ID and the value of the authCtxId parameter in the record, the inter-PLMN SBI request security controller is configured to use the mapping to validate SBI request messages by performing a lookup in the SBI message ID mappings database using a value of an authCtxId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and the inter-PLMN SBI request security controller is configured to perform the network security action when the SEPP ID associated with the second inter-PLMN SBI request message does not match the SEPP ID in the record.

According to another aspect of the subject matter described herein, the proxy NF ID associated with the first inter-PLMN SBI request message includes a SEPP ID, the SBI message ID read from the first inter-PLMN SBI request message includes a value of a ueCtxId parameter, the inter-PLMN SBI request security controller is configured to create and store the record that creates the mapping between the proxy NF ID and the SBI message ID by writing the SEPP ID and the value of the ueCtxId parameter in the record, the inter-PLMN SBI request security controller is configured to use the mapping to validate SBI request messages by performing a lookup in the SBI message ID mappings database using a value of an ueCtxId parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record, and the inter-PLMN SBI request security controller is configured to perform the network security action when the SEPP ID associated with the second inter-PLMN SBI request message does not match the SEPP ID in the record.

According to another aspect of the subject matter described herein, the inter-PLMN SBI request security controller is configured to perform the network security action by at least one of: rejecting the second inter-PLMN SBI request message and generating and transmitting a fake error response message.

According to another aspect of the subject matter described herein, a non-transitory computer readable medium having stored thereon executable instructions that when executed by a processor of a computer control the computer to perform steps is provided. The steps include receiving, by a proxy network function (NF), a first inter-public land mobile network (PLMN) service-based interface (SBI) request message;. The steps further include obtaining, by the proxy NF, a proxy NF ID associated with the first inter-PLMN SBI request message. The steps further include forwarding, by the proxy NF, the first inter-PLMN SBI request message to a producer NF. The steps further include receiving, by the proxy NF and from the producer NF, a response message to the first inter-PLMN SBI request message. The steps further include reading, by the proxy NF and from the response message, an SBI message ID comprising a resource ID dynamically assigned by the producer NF in response to the first inter-PLMN SBI request message. The steps further include creating and storing, by the proxy NF and in an SBI message ID mappings database, a record that creates a mapping between the proxy NF ID and the SBI message ID. The steps further include using, by the proxy NF, the mapping to validate SBI request messages received by the proxy NF. The steps further include performing, by the proxy NF, a network security action for the SBI request messages for which validation fails.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
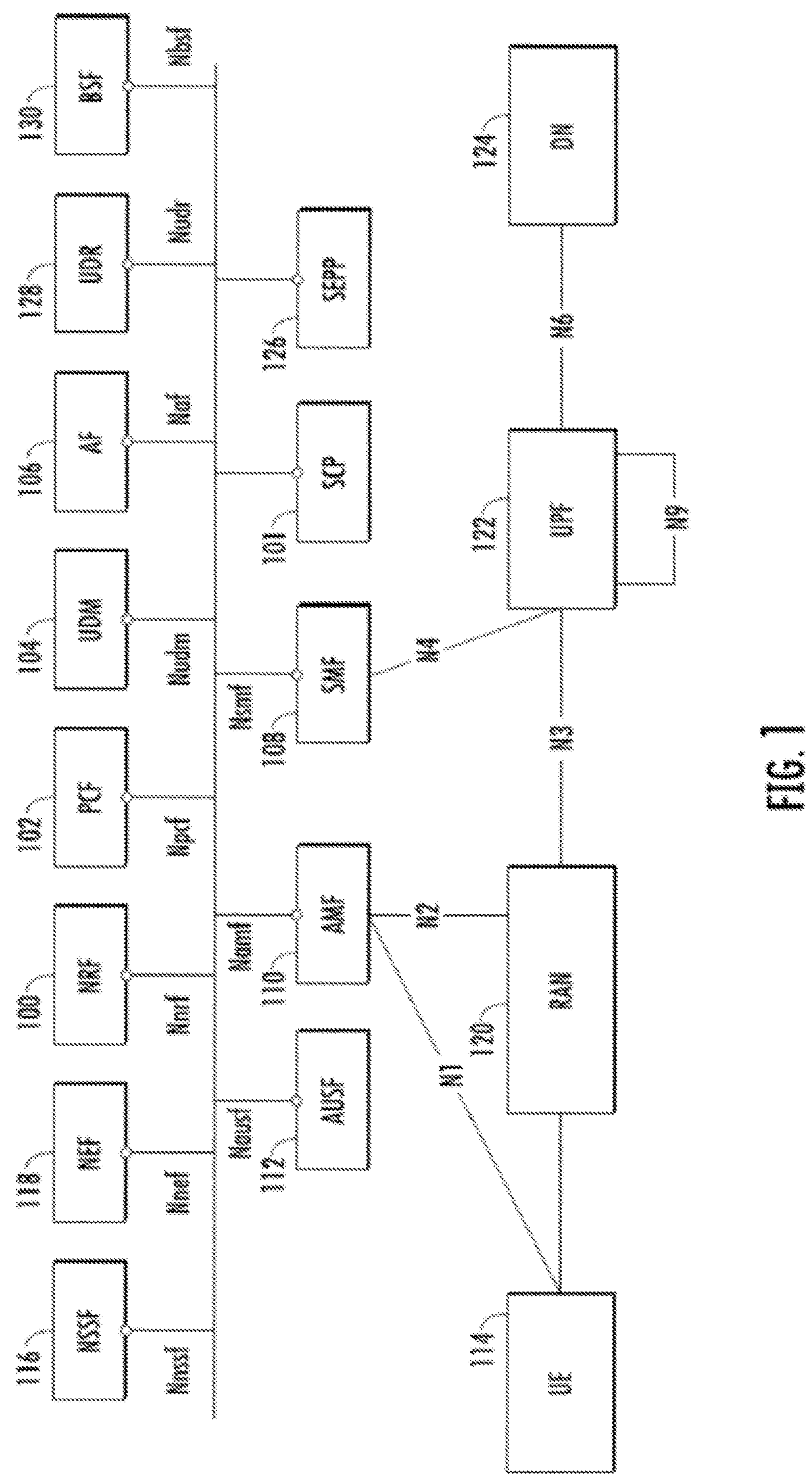
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As described above, one problem that can occur in 5G and other types of networks is that inter-PLMN SBI request messages from trusted networks can be used for different types of security attacks on producer NFs. 3GPP has defined the 5G SBI architecture based on representational state transfer (REST) application programming interfaces (APIs). REST APIs use HTTP methods acting on a resource in place of web APIs/functions provided by other architectures, such as simple object access protocol (SOAP). Each SBI REST resource is identified by a resource ID, such as a UE ID, smContextRef, pduSessionRef, subscriptionId, polAssoId, authCtxId, ueContextId, and others. A hacker may try to bombard a home NF, such as a UDM, via a home SEPP using invalid messages for denial of service at the home NF.

One possible solution to mitigate such attacks is to retrieve the UE ID from an SBI request message and validate the UE ID from the message against a pre-defined list of allowed UE IDs. However, UE ID validation based on a pre-defined list of allowed UE IDs is OPEX-intensive and does not work for messages without UE IDs.

The subject matter described herein mitigates security attacks by assigning run-time ownership to a serving network of SBI message IDs, where an SBI message ID can be any of the resource IDs described above and allowing only the owning serving network to use an SBI message ID once the SBI message ID has been assigned to the serving network at run time. For example, when a consumer NF sends an inter-PLMN subscription request to a home network, and the home network responds with a subscription ID, the home SEPP (H-SEPP) may maintain a mapping between the consumer SEPP (C-SEPP) ID and the subscription ID. If the H-SEPP receives an SBI request message including the subscription ID but a different C-SEPP ID, the H-SEPP will block the message. If the H-SEPP receives a message with a SEPP ID that matches the SEPP ID in the stored mapping between the SEPP ID and the subscription ID, the H-SEPP will allow the message to pass into the network.

In general, to mitigate security attacks from external networks, the subject matter described herein provides a solution to mitigate security attacks by validating the SBI message ID and C-SEPP ID. The H-SEPP or producer (P-SEPP) will use the SBI message ID-owning C-SEPP ID to mitigate security attacks. The SEPP will retrieve the SBI message ID and C-SEPP ID associated with an incoming SBI request message and validate the C-SEPP ID against a locally maintained mapping of an SBI message ID and allowed C-SEPP ID. When a 5G SBI request message arrives at the H-SEPP, the H-SEPP checks if the SBI message ID is from an allowed C-SEPP ID. A received 5G SBI request message is only allowed by the H-SEPP if the SBI request message is from an SBI message ID-owning C-SEPP. The H-SEPP will fail (and block) a received request message if the assertion fails (i.e., the request message will not be allowed into the network, and the producer NFs can be protected from DoS and other security attacks).

A security attack involves sending spoofing/corrupting/modifying the signaling data present in an SBI request message. A security attack often originates from a non-authorized (for the particular SBI message ID) but trusted serving network. For the reasons set forth above, there is a need to ensure that the signaling data carried in SBI messages are sent from an authorized C-SEPP.

Figure 2:
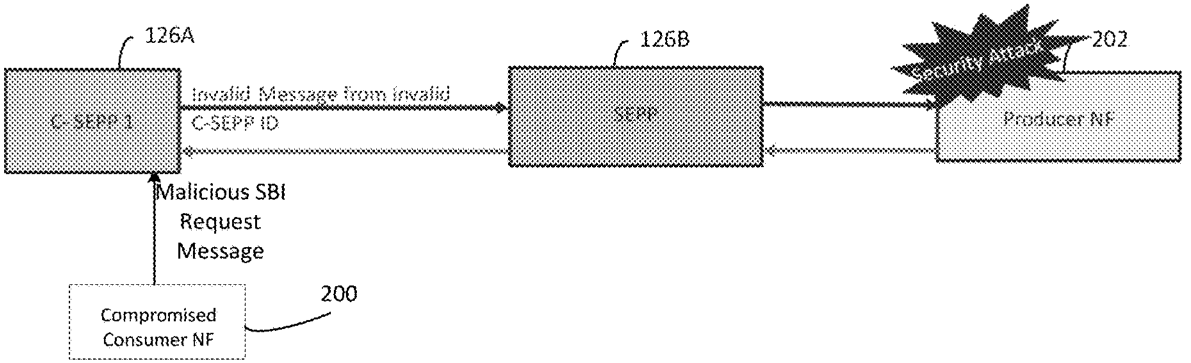
FIG. 2 is a network diagram illustrating the transmission of a malicious inter-PLMN SBI request message from a trusted visitor network to a producer NF.

FIG. 2 is a network diagram illustrating the transmission of a malicious inter-PLMN SBI request message from a non-home network to a producer NF located in the home network. Referring to FIG. 2, a compromised consumer NF 200 originates a malicious SBI request message and forwards the request to SEPP 126A. SEPP 126A forwards the SBI request message to SEPP 126B. SEPP 126B determines that the SBI request message originates from a trusted network and forwards the SBI request message to producer NF 202. The SBI request message may be successfully processed or may result in an error at producer NF 202. Producer NF 202 generates a response message and forwards the response message to SEPP 126B. SEPP 126B forwards the response message to SEPP 126A. SEPP 126A forwards the response message to consumer NF 200.

One problem with the scenario illustrated in FIG. 2 is that SEPP 126B allows the malicious SBI request message into the network without performing a check to see if the SEPP should be allowed to send a message concerning the resource identified in the message. If compromised consumer NF 200 generates a sufficient volume of SBI request messages directed to producer NF 202, consumer NF 200 can overwhelm the processing resources of producer NF 202. Malicious SBI request messages can also be used to steal subscriber information from the home network.

Figure 3:
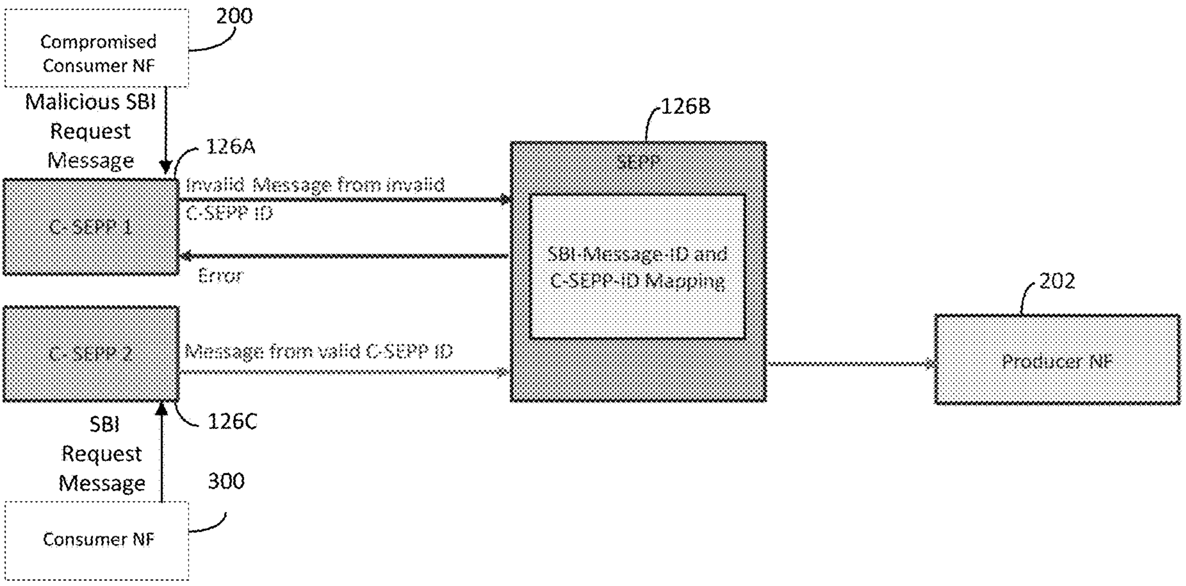
FIG. 3 is a diagram illustrating the use of mappings between dynamically assigned SBI message IDs and proxy NF IDs to mitigate security attacks on a producer NF.

To address the problem illustrated in FIG. 2, a proxy NF, such as a SEPP or an SCP, may perform the above-described storing of mappings between C-SEPP IDs and SBI message IDs and using the mappings to mitigate security attacks. FIG. 3 is a network diagram illustrating the use of mappings between C-SEPP IDs and SBI message IDs to mitigate security attacks. Referring to FIG. 3, compromised consumer NF 200 generates a malicious SBI request message with an invalid C-SEPP ID and forwards the malicious SBI request message to remote SEPP 126A. Remote SEPP 126A forwards the malicious SBI request message to SEPP 126B. SEPP 126B obtains the C-SEPP ID from the N2 context associated with the N2 connection over which the message was received and the SBI message ID from the message. SEPP 126B accesses the stored mappings between C-SEPP IDs and SBI message IDs by performing a lookup using the SBI message ID from the message and locating a mapping between the SBI message ID and a C-SEPP ID. In this case, SEPP 126B determines that the C-SEPP ID associated with the received message does not match the C-SEPP ID in the mapping located using the SBI message ID. Accordingly, SEPP 126B performs the network security actions of blocking the SBI request message from being forwarded to producer NF 202 and generating an error response on behalf of producer NF 202. In one example, the error response may be a fake error response that appears to originate from a producer NF.

In another scenario illustrated in FIG. 3, consumer NF 300 generates an SBI request message and forwards the SBI request message to remote SEPP 126C. Remote SEPP 126C forwards the SBI request message to SEPP 126B. SEPP 126B accesses the stored mappings using the SBI message ID obtained from the received message and determines that the C-SEPP ID associated with the message matches the C-SEPP in the mapping. Accordingly, SEPP 126B forwards the SBI request message to producer NF 202.

Figure 4:
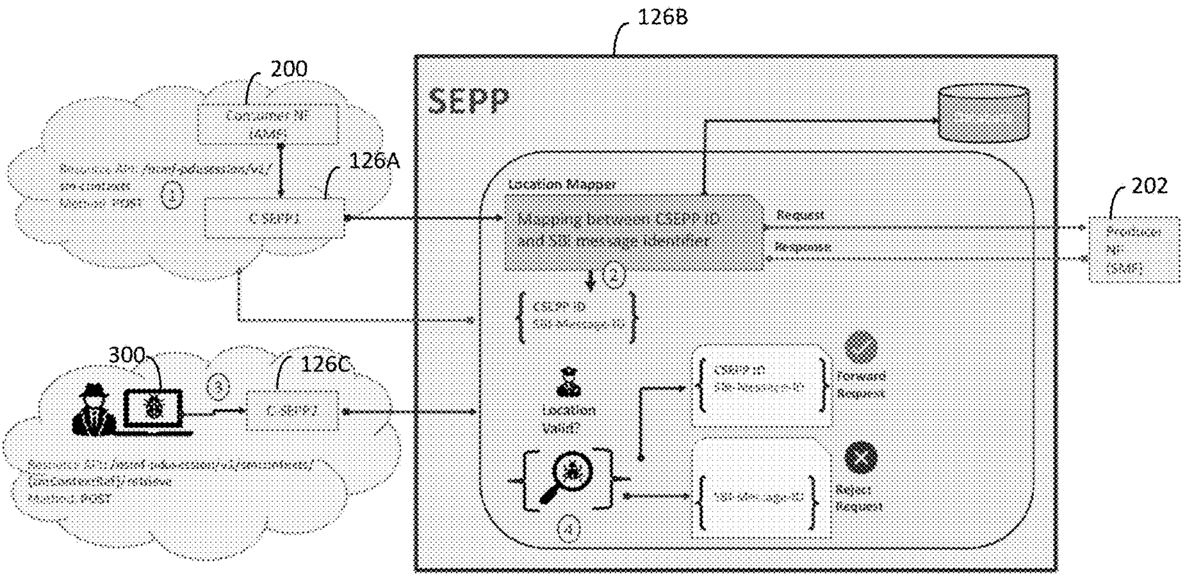
FIG. 4 is a diagram illustrating processing within the SEPP for using mappings between dynamically assigned SBI message IDs and proxy NF IDs to mitigate security attacks on a producer NF.

FIG. 4 is a diagram illustrating processing within the SEPP that uses mappings between dynamically assigned SBI message IDs and proxy NF IDs to mitigate security attacks on producer NFs. Referring to FIG. 4, consumer NF 200 sends an SBI request message to producer NF 202. In this example, the SBI request message is an SMF PDU session sm-contexts retrieve request. SEPP 126A receives the request and forwards the request to SEPP 126B. SEPP 126B obtains an identifier for SEPP 126A from the N2 context associated with the N2 connection over which the message was received and determines that the SBI request message does not include a resource ID that can be used as the SBI message ID because the resource has not yet been created. Accordingly, SEPP 126B stores the C-SEPP ID and forwards the request to producer NF 202. Producer NF 202 assigns a resource ID and returns the resource ID in a response to consumer NF 200. SEPP 126B receives the response and, in step 2, creates and stores in an SBI message ID mappings database a record that includes the SEPP ID of C-SEPP 126A and the SBI message ID, thereby creating a mapping between the SBI message ID and the SEPP ID of SEPP 126A.

In step 3, consumer NF 300 sends an SBI request message from unauthorized SEPP 126C. SEPP 126C forwards the message to SEPP 126B. SEPP 126B obtains the C-SEPP ID of SEPP 126C from an N2 context associated with an N2 connection over which the message was received and an SBI message ID from the message and uses the SBI message ID to perform a lookup in the stored mappings. SEPP 126B locates a database record including a mapping and determines that the that the C-SEPP ID in the mapping does not match C-SEPP ID obtained from the N2 context associated with the message in step 3. Accordingly, SEPP 126B rejects the SBI request message, as indicated by step 4.

Figures 5A, 5B:
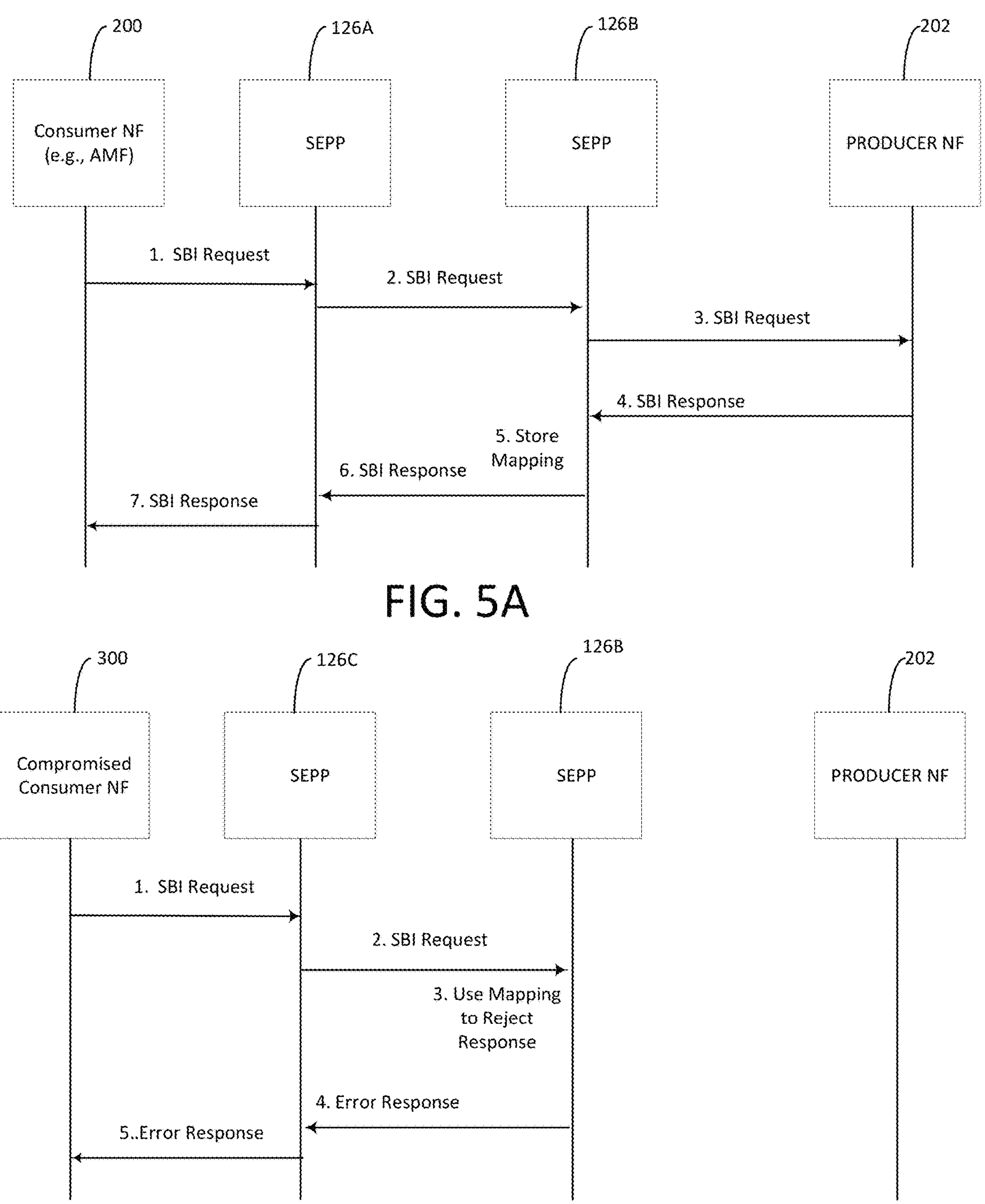
FIGS. 5A and 5B are message flow diagrams illustrating exemplary messages exchanged in a network where the SEPP uses mappings between dynamically assigned SBI message IDs and proxy NF IDs to mitigate security attacks on a producer NF.

FIGS. 5A and 5B are message flow diagrams illustrating exemplary messages exchanged in a network where the SEPP uses mappings between SBI message IDs and C-SEPP IDs to validate incoming SBI request messages. Referring to FIG. 5A, in step 1, consumer NF 200 sends an SBI request to producer NF 202 via SEPP 126A. In step 2, SEPP 126A forwards the request to SEPP 126B. In this example, SEPP 126A is functioning as the C-SEPP, and SEPP 126B is functioning as the H-SEPP or P-SEPP. In step 3, SEPP 126B receives the SBI request, obtains the C-SEPP ID associated with the message, and determines that the message does not have a resource ID that can be used to validate the message. In this example, the resource ID has not been assigned and will be assigned by the producer NF and communicated in the corresponding response message. For example, the SBI request message may an be/nsmf-pdusession/v1/smcontexts/{smContextRef}/retrieve message for retrieving an smContextRef ID from an SMF. In step 3, SEPP 126B receives the request message and forwards the request message to producer NF 202, which may be an SMF.

In step 4, producer NF 202 generates a response to the SBI request and sends the response to SEPP 126B. Continuing with the nsmf-pdusession smcontexts smContextRef retrieve example, the response may be a 200 OK message including a location header. The location header may contain the following content:

Location*{apiRoot}/nsmfpdusession/{apiVersion}/sm-contexts/{smContextRef}, where {smContextRef} is the message parameter that carries the resource ID returned by producer NF 202 that can be used as an SBI message ID for validating SBI request messages received by SEPP 126B. In general, the types of resource IDs that can be used by the subject matter described herein to validate SBI request messages are those that are assigned at runtime by producer NFs and returned in response messages to consumer NFs to allow the consumer NFs to access the resources. Such dynamically assigned resource IDs are each uniquely assigned to a resource that should be accessible exclusively by the requesting consumer NF. As a result, such resource IDs should not come from networks other than that of the requesting consumer NF and can be used in a mapping to the C-SEPP ID of the network to validate subsequent SBI requests.

In step 5, SEPP 126B stores a mapping between the C-SEPP ID obtained in step 2 and the resource ID included as the smContextRef in the SBI response message. In step 6, SEPP 126B forwards the SBI request to SEPP 126A. In step 7, SEPP 126A forwards the response message to consumer NF 200.

Referring to FIG. 5B, in step 1, a consumer NF 300 generates a malicious SBI request and sends the SBI request to SEPP 126C. The malicious SBI request message may include the same resource ID included in the smContextRef attribute in step 4 of FIG. 5A. In step 2, SEPP 126C sends the SBI request to SEPP 126B. SEPP 126B obtains the C-SEPP ID from the N2 context associated with the connection over which the message was received and the SBI message ID from the message, performs a lookup in the stored mappings using the SBI message ID, locates a database record corresponding to the SBI message ID, and determines that the C-SEPP ID in the database record does not match the C-SEPP ID in the message. Accordingly, in step 4, SEPP 126B blocks the SBI request message and generates and sends an error response to SEPP 126C. As indicated above, the error response may be a fake error response generated on behalf of producer NF 202. In step 5, SEPP 126C forwards the response to consumer NF 300.

Figure 6:
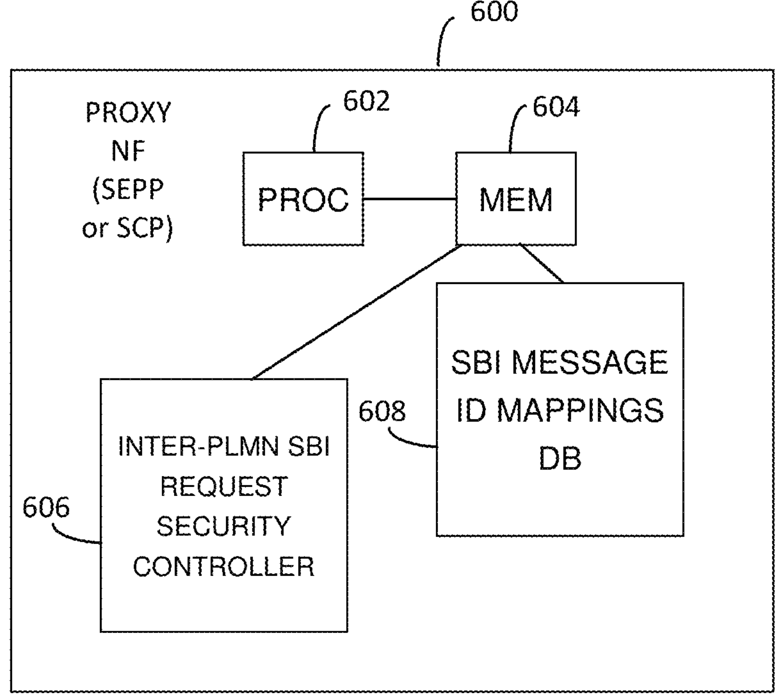
FIG. 6 is a block diagram illustrating an exemplary architecture of a proxy NF for mappings between dynamically assigned SBI message IDs and proxy NF IDs to mitigate security attacks.

As stated above, SBI request message validation using stored mappings between SBI message IDs and SEPP IDs can be performed at a proxy NF, such as a SEPP or an SCP. FIG. 6 is a block diagram illustrating a exemplary architecture of a proxy NF for using stored mappings between SBI message IDs and SEPP IDs to mitigate security attacks. Referring to FIG. 6, proxy NF 600 may be an SCP or an SEPP that includes at least one processor 602 and memory 604. Proxy NF 600 further includes an inter-PLMN SBI request security controller 606 for detecting and mitigating security attacks using stored mappings between SBI message IDs and SEPP IDs. Proxy NF 600 further includes an SBI message ID mappings database 608 that includes records that have mappings between SBI message IDs and SEPP IDs. SBI message ID mappings database 608 may be automatically created by SBI request security controller 606 using dynamically assigned resource IDs obtained from messages transmitted by producer NFs in message flows such as that illustrated in FIG. 5A. Inter-PLMN SBI request security controller 606 may be implemented using computer executable instructions stored in memory 604 and executed by processor 602.

Figure 7:
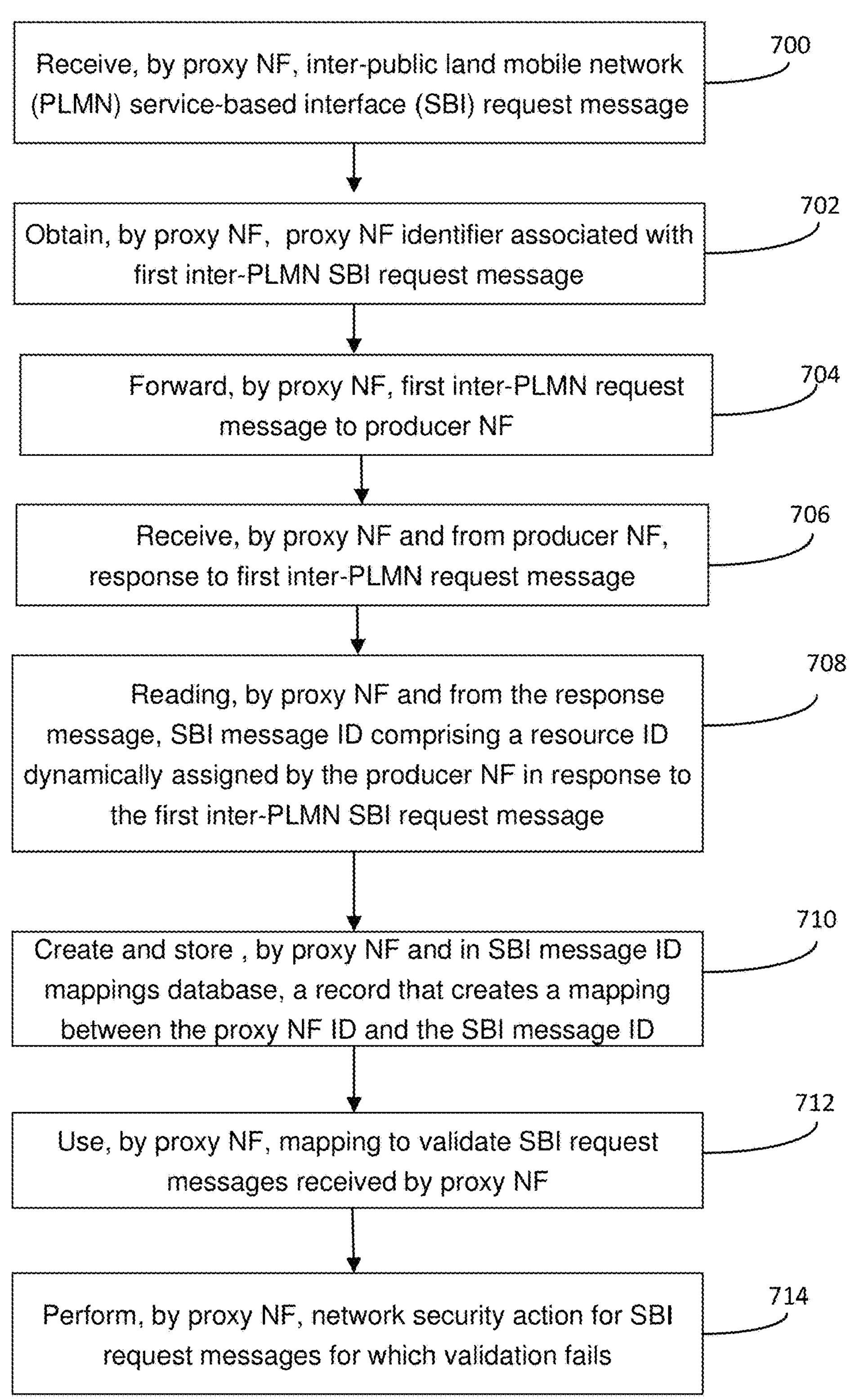
FIG. 7 is a flow chart illustrating an exemplary process for using mappings between dynamically assigned SBI message IDs and proxy NF IDs to mitigate security attacks on a producer NF.

FIG. 7 is a flow chart illustrating an exemplary process for detecting and mitigating security attacks on producer NFs using mappings between dynamically assigned SBI message IDs and proxy NF IDs. Referring to FIG. 7, in step 700, the process includes receiving, by the proxy NF, a first inter-PLMN SBI request message. For example, inter-PLMN SBI request security controller 606 of proxy NF 600 may receive an SBI request message transmitted by a C-SEPP in another PLMN.

In step 702, the process further includes obtaining, by the proxy NF, a proxy NF ID associated with the first inter-PLMN SBI request message. For example, inter-PLMN SBI request security controller 606 of proxy NF 600 may obtain an originating SEPP ID from N2 context information associated with an N2 connection over which an inter-PLMN SBI request message is received.

In step 704, the process includes forwarding, by the proxy NF, the first inter-PLMN request message to a producer NF. For example, inter-PLMN SBI request security controller 606 of proxy NF 600 may forward an inter-PLMN request message for which a resource has not yet been dynamically assigned to a producer NF.

In step 706, the process further includes receiving, by the proxy NF and from a producer NF, a response message to the first inter-PLMN SBI request message. For example, inter-PLMN SBI request security controller 606 of proxy NF 600 may receive a response message, such as a 200 OK message or a 201 Created message, from a producer NF in response to the SBI request message. The response message may include a resource ID dynamically assigned in response to the SBI request message for the consumer NF to access the resource in subsequent SBI request messages.

In step 708, the process further includes reading, by the proxy NF and from the response message, an SBI message ID comprising a resource ID dynamically assigned by the producer NF in response to the first inter-PLMN SBI request message. For example, inter-PLMN SBI request security controller 606 of proxy NF 600 may read a resource ID from the SBI response message, such as a 200 OK message or a 201 Created message, generated in response to an SBI request message for creating, retrieving, updating, or deleting a resource. The resource ID is dynamically assigned by the producer NF to a resource and communicated to the consumer NF so that the consumer NF can access the resource. Examples of dynamically assigned resource IDs that may be used as the SBI message IDs include any of the parameters in curly brackets { } in Table 1 below. For the/namf-comm/v1/subscriptions POST request, the subscriptionId will be included in a response to the request, and the subscriptionId can be used as the dynamic resource ID. For the /nnssaaf-nssaa/v1/slice-authentications POST request, the authCtxId will be included in a response to the request, and the authCtxId can be used as the dynamic resource ID.

TABLE 1

Resource URIs Including Dynamically Assigned IDs Usable as SBI Message IDs for Message Validation

| Resource URI | HTTP Method |
|---|---|
| /nsmf-pdusession/v1/sm-contexts/{smContextRef}/retrieve | POST |
| /nsmf-pdusession/v1/sm-contexts/{smContextRef}/modify | POST |
| /nsmf-pdusession/v1/sm-contexts/{smContextRef}/release | POST |
| /nsmf-pdusession/v1/pdu-sessions/{pduSessionRef}/modify | POST |
| /nsmf-pdusession/v1/pdu-sessions/{pduSessionRef}/release | POST |
| /nsmf-pdusession/v1/sm-contexts/{smContextRef}/send-mo-data | POST |
| /nsmf-pdusession/v1/pdu-sessions/{pduSessionRef}/retrieve | POST |
| /nsmf-pdusession/v1/pdu-sessions/{pduSessionRef}/transfer-mo-data | POST |
| /nudm-sdm/v2/shared-data-subscriptions/{subscriptionId} | DELETE |
| /npcf-am-policy-control/v1/policies/{polAssoId} | GET, DELETE |
| /npcf-am-policy-control/v1/policies/{polAssoId}/update | POST |
| /nausf-auth/v1/ue-authentications/{authCtxId}/5g-aka-confirmation | PUT, DELETE |
| /nausf-auth/v1/ue-authentications/{authCtxId}/eap-session | DELETE |
| /namf-comm/v1/ue-contexts/{ueContextId}/n1-n2-messages | POST |
| namf-comm/v1/ue-contexts/{ueContextId}/n1-n2-messages/subscriptions | POST |
| /namf-comm/v1/subscriptions | POST |
| /namf-comm/v1/subscriptions/{subscriptionId} | PUT, DELETE |
| /npcf-ue-policy-control/v1/policies/{polAssoId} | GET, DELETE |
| /npcf-ue-policy-control/v1/policies/{polAssoId}/update | POST |
| /nnssaaf-nssaa/v1/slice-authentications | POST |
| /nnssaaf-nssaa/v1/slice-authentications/{authCtxId} | PUT |

In Table 1, the left-hand column illustrates SBI resource URIs that are used to access services provided by producer NFs. For example, the first entry in Table 1 is/nsmf-pdusession/v1/sm-contexts/{smContextRef}/retrieve, which is a resource URI sent from an AMF to an SMF along with an HTTP POST method to retrieve an smContextRef ID usable to access an SM contexts resource for the PDU session. The value of the smContextRef ID is an example of a dynamically assigned resource ID that can be used as an SBI message ID to validate subsequently received SBI request messages.

In step 710, the process further includes creating and storing, by the proxy NF and in an SBI message ID mappings database, a record that creates a mapping between the proxy NF ID and SBI message ID. Continuing with the pduSession sm-contexts smContextRef retrieve example, inter-PLMN SBI request security controller 606 of proxy NF 600 may store the value of the {smContextRef} parameter in a record in SBI message ID mappings database 608 when proxy NF 600 receives a response to an nsmf-pduSession sm-contexts smContextRef retrieve request transmitted by an AMF to an SMF. The record may also include the C-SEPP ID obtained in step 702.

In step 712, the process further includes using, by the proxy NF, the mapping to validate SBI request messages received by the proxy NF. For example, inter-PLMN SBI request security controller 606 of proxy NF 600 may receive inter-PLMN request messages from SEPPs of other networks, read SBI message IDs from the messages, use the SBI message IDs to perform lookups in SBI message ID mappings database 608, locate matching records, read SEPP IDs from the matching records, compare the SEPP IDs to SEPP IDs associated with the inter-PLMN SBI request messages, and determine whether the SEPP IDs match. For a received SBI request message, if the SEPP ID associated with the message (e.g., obtained from the N2 context information associated with the N2 connection with the remote SEPP from which the message was received) does not match the SEPP ID read from the record in SBI message ID mappings database 608, inter-PLMN SBI request security controller 606 may identify the message as malicious.

Continuing with the smContextRef example, a received nsmf-pdusession smContextRef retrieve, modify, or delete request may include an smContextRef parameter. Inter-PLMN SBI request security controller 606 reads the value of the smContextRef parameter, uses the value to perform a lookup in SBI message ID mappings database 608, and locates a matching record. Inter-PLMN SBI request security controller 606 reads the SEPP ID from the record and compares the SEPP ID with the remote SEPP ID associated with the N2 context for the N2 connection over which the pduSession smContextRef retrieve, modify, or delete request was received. In this example, assume that the SEPP ID in the record is SEPP1 and the remote SEPP ID associated with the N2 context is SEPP2. Because the SEPP IDs do not match, inter-PLMN SBI request security controller 606 may identify the pduSession smContextRef retrieve, modify, or delete request as malicious.

In another example, if the received message contains the following URI:/npcf-ue-policy-control/v1/policies/{polAssoId}/update, inter-PLMN SBI request security controller 606 may retrieve the value of the polAssoId parameter from the message, use the value to perform a lookup in SBI message ID mappings database 608, locate a matching record, and read the SEPP ID from the record. Inter-PLMN SBI request security controller 606 may then compare the SEPP ID obtained from the matching record with the SEPP ID obtained from the N2 context associated with the N2 connection over which the message was received. If the SEPP IDs match, inter-PLMN SBI request security controller 606 may determine that the message is not malicious. If the SEPP IDs do not match, inter-PLMN SBI request security controller 606 may identify the message as malicious.

In step 714, the process further includes performing, by the proxy NF, a network security action for the messages for which the validation fails. For example, if the validation in step 712 fails, inter-PLMN SBI request security controller 606 of proxy NF 600 may block the inter-PLMN SBI request message, block, throttle or limit subsequent messages from the consumer NF, generate a fake error response message on behalf of the producer NF, and/or alert a network operator of the attack. Messages to be throttled, blocked, or limited can be identified based on consumer NF, consumer SEPP, or producer service API.

Exemplary advantages of the subject matter described herein include the ability to mitigate security attacks which are initiated from unauthorized C-SEPP IDs (serving networks) and can mitigate security attacks or bad data that can cause producer NFs to fail in unexpected ways. The subject matter described herein can be used to mitigate the attack scenarios described herein as well as new attacks that are initiated from external PLMNs. Because the subject matter described herein validates messages using dynamically assigned SBI message IDs, it can provide security when the inter-PLMN SBI request messages do not include a UE ID. As indicated above, the types of attacks that can be mitigated include Dos attacks and attacks designed to steal network or subscriber information. The subject matter described herein can be implemented using configuration-based business rules created at run time without modifying SEPP software, which provides flexibility to enhance security checks as per evolving business rules. The subject matter described herein can be implemented at any suitable proxy node, including a non-hosted SEPP, a hosted-SEPP, a SEPP that functions as a roaming hub, and an SCP. A hosted SEPP is a SEPP hosted by an IP exchange (IPX) provider. A non-hosted SEPP is a SEPP operated by the same network operator that operates the PLMN. A roaming hub is an interconnection platform used to connect different mobile networks and is operated by a roaming hub provider.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.4.0 (2023-09)
2. 3rd Generation Partnership Project; Technical Specification Group Services and System Aspects; System architecture for the 5G System; Stage 2 (Release 18) 3GPP TS 23.501 V18.3.0 (2023-09)
3. 3rd Generation Partnership Project; Technical Specification Group Core Network and Terminals; 5G System; Technical Realization of Service Based Architecture; Stage 3 (Release 18) 3GPP TS 29.500 V18.3.0 (2023-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting and mitigating security attacks on producer network functions (NFs) using mappings between dynamically assigned service-based interface (SBI) message IDs and consumer security edge protection proxy (C-SEPP) IDs, the method comprising:

receiving, by a producer SEPP (P-SEPP), a first inter-public land mobile network (PLMN) SBI request message;

obtaining, by the P-SEPP, a C-SEPP ID associated with the first inter-PLMN SBI request message;

forwarding, by the P-SEPP, the first inter-PLMN SBI request message to a producer NF;

receiving, by the P-SEPP and from the producer NF, a response message to the first inter-PLMN SBI request message;

reading, by the P-SEPP and from the response message, an SBI message ID comprising a resource ID dynamically assigned by the producer NF in response to the first inter-PLMN SBI request message;

creating and storing, by the P-SEPP and in an SBI message ID mappings database, a record that creates a mapping between the C-SEPP ID and the SBI message ID;

using, by the P-SEPP, the mapping to validate SBI request messages received by the P-SEPP; and performing, by the P-SEPP, a network security action for the SBI request messages for which validation fails.

2. The method of claim 1 wherein:

using the mapping to validate SBI request messages includes performing a lookup in the SBI message ID mappings database using a resource ID from a second inter-PLMN SBI request message received by the P-SEPP and locating the record, obtaining a C-SEPP ID associated with the second inter-PLMN SBI request message, and determining whether the C-SEPP ID associated with the second inter-PLMN SBI request message matches the C-SEPP ID in the record; and performing the network security action includes at least one of: rejecting the second inter-PLMN SBI request message and generating and transmitting a fake error response message when the C-SEPP ID associated with the second inter-PLMN SBI request message does not match the C-SEPP ID in the record.

3. The method of claim 1 wherein:

obtaining the proxy NF ID includes obtaining a SEPP ID;

reading the SBI message ID includes reading a value of an smContextRef parameter;

creating and storing the record that creates the mapping between the proxy NF ID and the SBI message ID includes writing the SEPP ID and the value of the smContextRef parameter in the record;

using the mapping to validate SBI request messages includes performing a lookup in the SBI message ID mappings database using a value of an smContextRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

4. The method of claim 1 wherein:

obtaining the proxy NF ID includes obtaining a SEPP ID;

reading the SBI message ID includes reading a value of a pduSessionRef parameter;

creating and storing the record that creates the mapping between the proxy NF ID and the SBI message ID includes writing the SEPP ID and the value of the pduSessionRef parameter in the record;

using the mapping to validate SBI request messages includes performing a lookup in the SBI message ID mappings database using a value of a pduSessionRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

5. The method of claim 1 wherein:

obtaining the proxy NF ID includes obtaining a SEPP ID;

reading the SBI message ID includes reading a value of a subscriptionld parameter;

storing the record that creates the mapping between the proxy NF ID and the SBI message ID includes writing the SEPP ID and the value of the subscriptionld parameter in the record;

using the mapping to validate SBI request messages includes performing a lookup in the SBI message ID mappings database using a value of a subscriptionld parameter from a second inter-PLMN SBI request message, obtaining a SEPP ID associated with the second inter-PLMN SBI request message received by the proxy NF, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

6. The method of claim 1 wherein:

obtaining the proxy NF ID includes obtaining a SEPP ID;

reading the SBI message ID includes reading a value of a polAssold parameter;

creating and storing the record that creates the mapping between the proxy NF ID and the SBI message ID includes writing the SEPP ID and the value of the polAssold parameter in the record;

using the mapping to validate SBI request messages includes performing a lookup in the SBI message ID mappings database using a value of a polAssold parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

7. The method of claim 1 wherein:

obtaining the proxy NF ID includes obtaining a SEPP ID;

reading the SBI message ID includes reading a value of an authCtxld parameter;

storing the record that creates the mapping between the proxy NF ID and the SBI message ID includes writing the SEPP ID and the value of the authCtxld parameter in the record;

using the mapping to validate SBI request messages includes performing a lookup in the SBI message ID mappings database using a value of an authCtxld parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

8. The method of claim 1 wherein:

obtaining the proxy NF ID includes obtaining a SEPP ID;

reading the SBI message ID includes reading a value of a ueCtxld parameter;

creating and storing the record that creates the mapping between the proxy NF ID and the SBI message ID includes writing the SEPP ID and the value of the ueCtxld parameter in the record;

using the mapping to validate SBI request messages includes performing a lookup in the SBI message ID mappings database using a value of an ueCtxld parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and performing the network security action includes performing the network security action when the SEPP ID associated with the second inter-PLMN SBI request message does not match the SEPP ID in the record.

9. The method of claim 1 wherein performing the network security action includes at least one of: rejecting the second inter- PLMN SBI request message and generating and transmitting a fake error response message.

10. A system for detecting and mitigating security attacks on producer network functions (NFs) using mappings between dynamically assigned service-based interface (SBI) message IDs and proxy NF IDs, the system comprising:

a proxy NF including at least one processor and a memory;

an inter-PLMN SBI request security controller implemented by the at least one processor for receiving a first inter-public land mobile network (PLMN) SBI request message, obtaining a proxy NF ID associated with the first inter- PLMN SBI request message, forwarding the first inter-PLMN SBI request message to a producer NF, receiving, from the producer NF, a response message to the first inter-PLMN SBI request message, reading, from the response message, an SBI message ID comprising a resource ID dynamically assigned by the producer NF in response to the first inter-PLMN SBI request message, creating and storing, by the proxy NF and in an SBI message ID mappings database, a record that creates a mapping between the proxy NF ID and the SBI message ID, using the mapping to validate SBI request messages received by the proxy NF, and performing a network security action for the SBI request messages for which validation fails.

11. The system of claim 10 wherein the inter-PLMN SBI request security controller is configured to:

use the mapping to validate SBI request messages by performing a lookup in the SBI message ID mappings database using a resource ID from a second inter-PLMN SBI request message received by the P-SEPP and locating the record, obtaining a C-SEPP ID associated with the second inter-PLMN SBI request message, and determining whether the C-SEPP ID associated with the second inter-PLMN SBI request message matches the C-SEPP ID in the record; and perform the network security action by at least one of: rejecting the second inter-PLMN SBI request message and generating and transmitting a fake error response message when the C-SEPP ID associated with the second inter-PLMN SBI request message does not match the C-SEPP ID in the record.

12. The system of claim 10 wherein:

the proxy NF ID associated with the first inter-PLMN SBI request message comprises a SEPP ID;

the SBI message ID read from the first inter-PLMN SBI request message includes a value of an smContextRef parameter;

the inter-PLMN request security controller is configured to create and store the record that creates the mapping between the proxy NF ID and the SBI message ID by writing the SEPP ID and the value of the smContextRef parameter in the record;

the inter-PLMN SBI request security controller is configured to use the mapping to validate SBI request messages by performing a lookup in the SBI message ID mappings database using a value of an smContextRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record;

and the inter-PLMN SBI request security controller is configured to perform the network security action when the SEPP ID associated with the second inter- PLMN SBI request message does not match the SEPP ID in the record.

13. The system of claim 10 wherein:

the proxy NF ID associated with the first inter-PLMN SBI request message comprises a SEPP ID;

the SBI message ID read from the first inter-PLMN SBI request message comprises a value of a pduSessionRef parameter;

the inter-PLMN SBI request security controller is configured to create and store the record that creates the mapping between the proxy NF ID and the SBI message ID by writing the SEPP ID and the value of the pduSessionRef parameter in the record;

the inter-PLMN SBI request security controller is configured to use the mapping to validate SBI request messages by performing a lookup in the SBI message ID mappings database using a value of a pduSessionRef parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and the inter-PLMN SBI request security controller is configured to perform the network security action when the SEPP ID associated with the second inter- PLMN SBI request message does not match the SEPP ID in the record.

14. The system of claim 10 wherein:

the proxy NF ID associated with the first inter-PLMN SBI request message includes a SEPP ID;

the SBI message ID read from the first inter-PLMN SBI request message includes a value of a subscriptionld parameter;

the inter-PLMN SBI request security controller is configured to store the record that creates the mapping between the proxy NF ID and the SBI message ID by writing the SEPP ID and the value of the subscriptionld parameter in the record;

the inter-PLMN SBI request security controller is configured to use the mapping to validate SBI request messages by performing a lookup in the SBI message ID mappings database using a value of a subscriptionld parameter from a second inter-PLMN SBI request message, obtaining a SEPP ID associated with the second inter-PLMN SBI request message received by the proxy NF, and determining whether the SEPP ID associated with the second inter-PLMN SBI request message matches the SEPP ID in the record; and the inter-PLMN SBI request security controller is configured to perform the network security action when the SEPP ID associated with the second inter- PLMN SBI request message does not match the SEPP ID in the record.

15. The system of claim 10 wherein:

the proxy NF ID associated with the first inter-PLMN SBI request message includes a SEPP ID;

the SBI message ID read from the first inter-PLMN SBI request message includes a value of a polAssold parameter;

the inter-PLMN SBI request security controller is configured to create and store the record that creates the mapping between the proxy NF ID and the SBI message ID by writing the SEPP ID and the value of the polAssold parameter in the record;

the inter-PLMN SBI request security controller is configured to using the mapping to validate SBI request messages by performing a lookup in the SBI message ID mappings database using a value of a polAssold parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and the inter-PLMN SBI request security controller is configured to perform the network security action when the SEPP ID associated with the second inter- PLMN SBI request message does not match the SEPP ID in the record.

16. The system of claim 10 wherein:

the proxy NF ID associated with the first inter-PLMN SBI request message includes a SEPP ID;

the SBI message ID read from the first inter-PLMN SBI request message includes a value of an authCtxld parameter;

the inter-PLMN SBI request security controller is configured to store the record that creates the mapping between the proxy NF ID and the SBI message ID by writing the SEPP ID and the value of the authCtxld parameter in the record;

the inter-PLMN SBI request security controller is configured to use the mapping to validate SBI request messages by performing a lookup in the SBI message ID mappings database using a value of an authCtxld parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and the inter-PLMN SBI request security controller is configured to perform the network security action when the SEPP ID associated with the second inter- PLMN SBI request message does not match the SEPP ID in the record.

17. The system of claim 10 wherein:

the proxy NF ID associated with the first inter-PLMN SBI request message includes a SEPP ID;

the SBI message ID read from the first inter-PLMN SBI request message includes a value of a ueCtxld parameter;

the inter-PLMN SBI request security controller is configured to create and store the record that creates the mapping between the proxy NF ID and the SBI message ID by writing the SEPP ID and the value of the ueCtxld parameter in the record;

the inter-PLMN SBI request security controller is configured to use the mapping to validate SBI request messages by performing a lookup in the SBI message ID mappings database using a value of an ueCtxld parameter from a second inter-PLMN SBI request message received by the proxy NF and locating the record, obtaining a SEPP ID associated with the second inter-PLMN SBI request message, and determining whether the SEPP ID associated with the second inter-PLMN SBI request message matches the SEPP ID in the record; and the inter-PLMN SBI request security controller is configured to perform the network security action when the SEPP ID associated with the second inter- PLMN SBI request message does not match the SEPP ID in the record.

18. The system of claim 10 wherein the inter-PLMN SBI request security controller is configured to perform the network security action by at least one of: rejecting the second inter-PLMN SBI request message and generating and transmitting a fake error response message.

19. A non-transitory computer readable medium having stored thereon executable instructions that when executed by a processor of a computer control the computer to perform steps comprising:

receiving, by a producer security edge protection proxy (P-SEPP), a first inter-public land mobile network (PLMN) service-based interface (SBI) request message;

obtaining, by the P-SEPP, a C-SEPP ID associated with the first inter-PLMN SBI request message;

forwarding, by the P-SEPP, the first inter-PLMN SBI request message to a producer NF;

receiving, by the P-SEPP and from the producer NF, a response message to the first inter-PLMN SBI request message;

reading, by the P-SEPP and from the response message, an SBI message ID comprising a resource ID dynamically assigned by the producer NF in response to the first inter-PLMN SBI request message;

creating and storing, by the P-SEPP and in an SBI message ID mappings database, a record that creates a mapping between the C-SEPP ID and the SBI message ID;

using, by the P-SEPP, the mapping to validate SBI request messages received by the P-SEPP; and performing, by the P-SEPP, a network security action for the SBI request messages for which validation fails.

* * * * *